United States Patent [19]
Fourrey et al.

[11] Patent Number: 5,397,167
[45] Date of Patent: Mar. 14, 1995

[54] SEAT AND ITS APPLICATION PARTICULARLY TO A VEHICLE

[75] Inventors: Francois Fourrey, Montebeliard; Frédéric Guaurrand, Hericourt; Jean Pierre Chabanne, Champvallon; Sylvain Harry, Bellegarde, all of France

[73] Assignee: Cesa-Compagnie Europeenne de Sieges pour Automobiles, Levallois-Perret Cedex, France

[21] Appl. No.: 73,429

[22] Filed: Jun. 9, 1993

[30] Foreign Application Priority Data

Jun. 10, 1992 [FR] France ................. 92 06997

[51] Int. Cl.⁶ ............................................. B60N 2/02
[52] U.S. Cl. ............................ 297/354.13; 297/378.1
[58] Field of Search ............... 297/354.13, 378.1, 320, 297/319, 340, 331, 335

[56] References Cited

U.S. PATENT DOCUMENTS

| | | |
|---|---|---|
| 2,949,331 | 8/1960 | Himka . |
| 3,083,051 | 3/1963 | Milbourne .................. 297/378.1 |
| 3,311,405 | 3/1967 | Brennan . |
| 3,711,153 | 1/1973 | Cunningham ............... 297/378.1 |
| 3,727,976 | 4/1973 | Lystad . |
| 5,261,725 | 11/1993 | Rudolph ................... 297/354.13 |

FOREIGN PATENT DOCUMENTS

| | | |
|---|---|---|
| 228923 | 7/1987 | European Pat. Off. . |
| 2556946 | 6/1985 | France . |
| 2589800 | 5/1987 | France . |
| 2625955 | 7/1989 | France . |
| 2155780 | 10/1985 | United Kingdom . |

Primary Examiner—John T. Kwon
Attorney, Agent, or Firm—Sughrue, Mion, Zinn, Macpeak & Seas

[57] ABSTRACT

The multi-position seat is fitted with linkage rod (50) which comprise a connecting rod assembly (51), a scissor-type stay (52), preferably a biasing urging element (53), as well as limit stops (54) and a stop-piece (55), a cam (56) and also a cam follower (57). These linkage rod provide the automatic control of the relative displacements of the seat part and backrest cushions during changes in their relative positions.

18 Claims, 10 Drawing Sheets

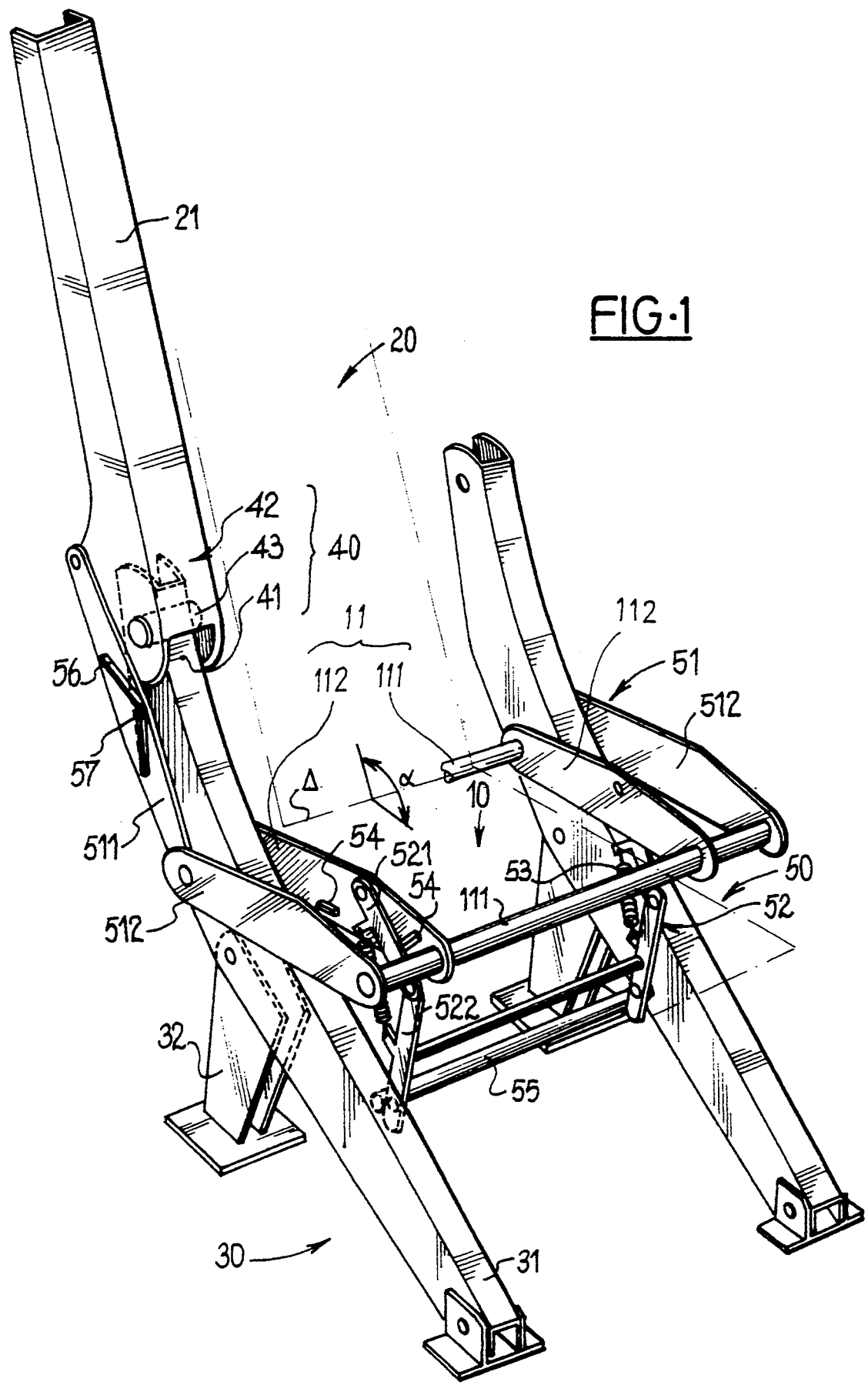
FIG·1

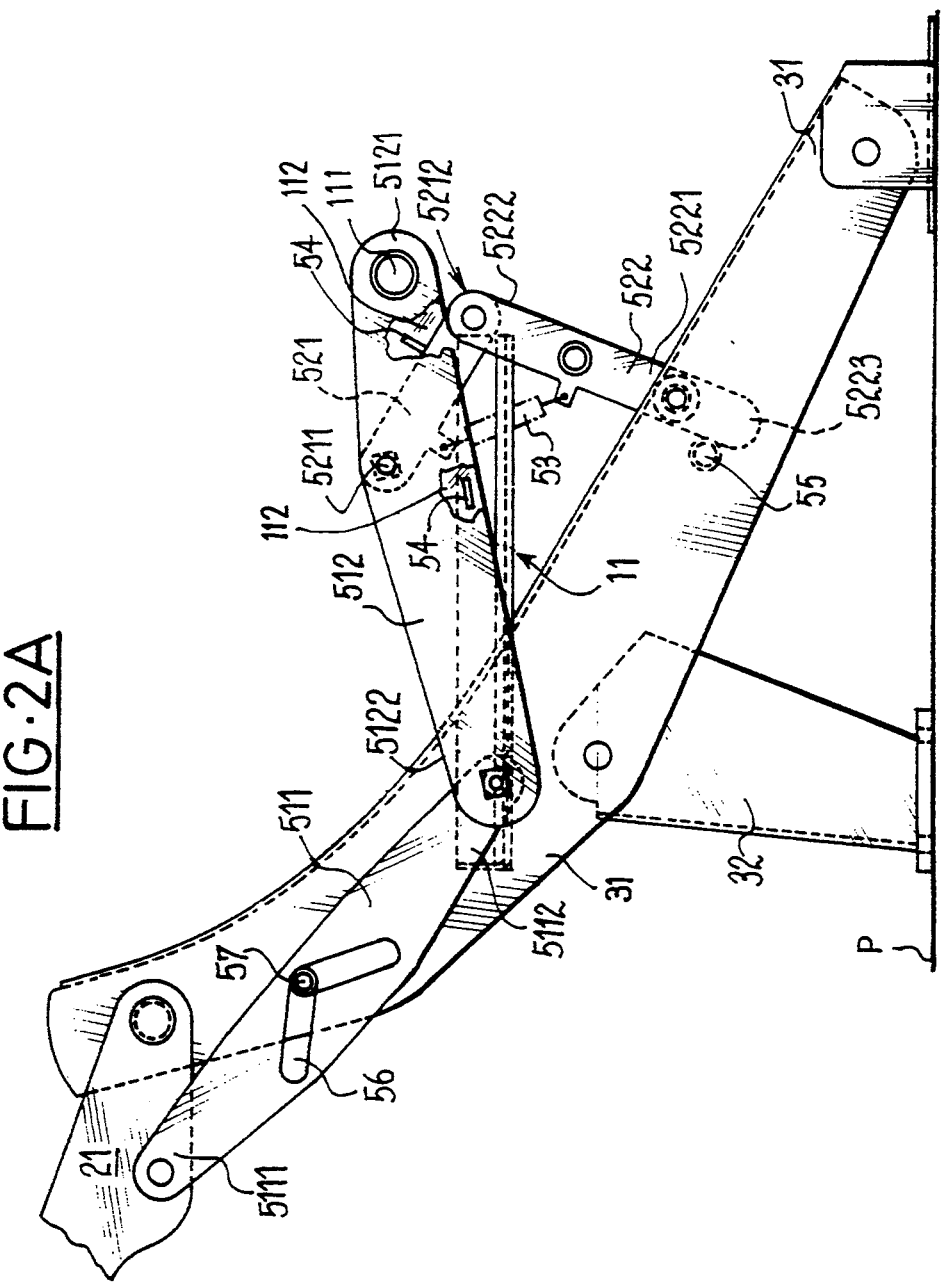
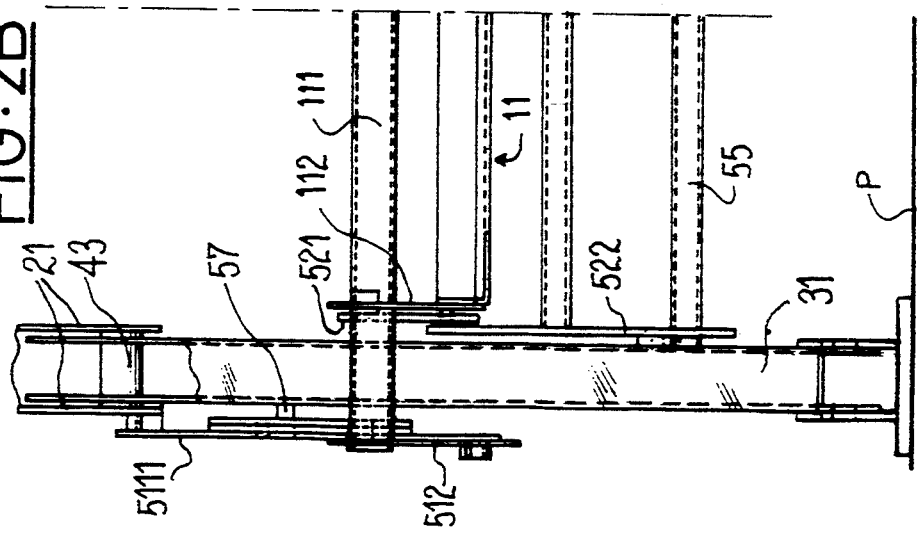

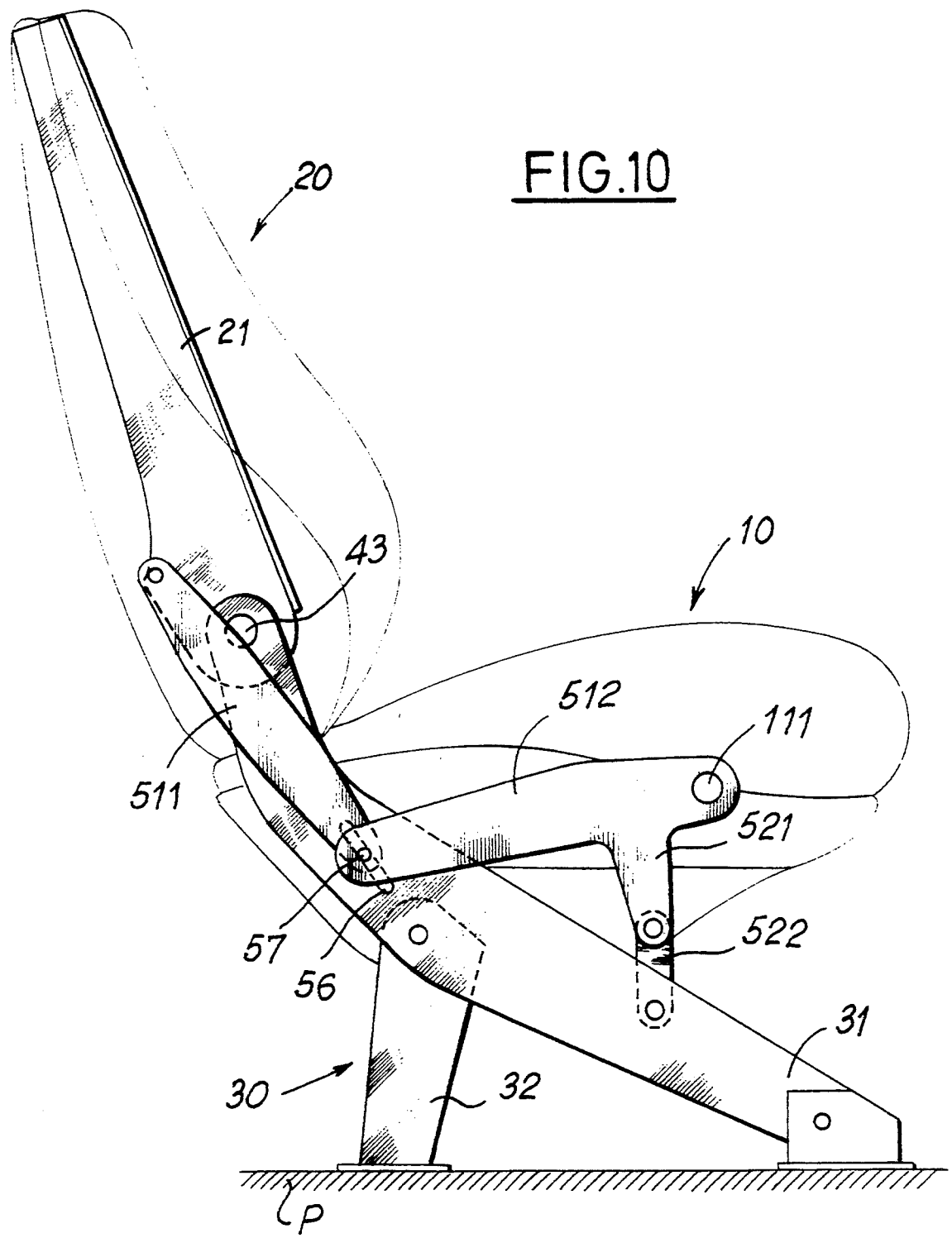

SEAT AND ITS APPLICATION PARTICULARLY TO A VEHICLE

The present invention relates to seats and, particularly, to the seats of land motor vehicles capable of occupying several, preferably predetermined, adjustment positions.

The contemporary tendency of motor car manufacturers is to design so-called "single-volume people carrier") type vehicles which derive both from the internal compartment called an "estate" and from the utility vehicle called a small van. Given the universal nature of use envisaged for these vehicles, it is necessary to equip them with seats which are capable of assuming multiple and varied, preferably predetermined, positions, that is to say capable of assuming a number of discrete positions, each position being well defined. Seats of this type must, for example, be capable of opening out completely into a bunk if needs be, into a relaxation chair or "lounger", into a normal so-called driving or travelling seat, or to fold out partially into a panel and must also be able to be retracted so as to fold partially or fold up totally in a compact and relatively unbulky manner for the purpose of withdrawing them into the vehicle, or removing them from the latter.

Such seats must also satisfy safety standards decreed by professional organisations or the authorities, so that the occupant of a seat is effectively held in the latter by the seat belt in the event of violent impacts particularly with a high longitudinal component, referenced with respect to the vehicle.

This latter constraint becomes particularly difficult to satisfy when, as becomes more and more common, such a seat belt is no longer directly anchored at two or three points to the structure or shell of the vehicle, the seat belt being somewhat independent of the seat, but in contrast this belt forms part of the seat and is somewhat "on-beard" the latter, the various points of anchorage of the seat belt being established directly on the seat itself. In such a situation of on-board belt, in the event of violent impacts, the forces to be absorbed and/or transmitted are therefore essentially localized in the zone of the axis of relative inclination of the backrest and of the seat part of the seat, on the one hand, and into the zone of the underframe habitually connecting the seat part of the seat to the floor of the vehicle, on the other hand.

It is thus understood that there is every possible difficulty in satisfying all of these requirements, which are often contradictory, in particularly when it is remembered that such a seat must be mass-produced and at minimum cost.

One solution is disclosed in the document FR 92 04 448 filed on Apr. 10, 1992 in the name of the Applicant Company. However, this solution does not suit all situations because the relative positions of the cushions change quite a lot.

The object of the invention is to overcome the majority of these difficulties.

The subject of the invention is a multi-position seat with at least one normal position and one relaxation position for vehicles and comprising, inter alia, a seat part with a framework for a cushion, a backrest with a framework for a cushion, an underframe adapted to rest the seat on a floor, an articulation making it possible to change the relative positions of these seat part and backrest cushions and of linkage rod means connecting these seat part and backrest frameworks for automatically controlling the relative displacements of these seat part and backrest cushions during change in their relative positions. This seat is particularly noteworthy in that this articulation connects the backrest framework and the underframe, in that these linkage rod means comprise a connecting rod assembly made, on the one hand, of a top connecting rod with one extremity which is retained and mounted pivotably relative to this framework of the backrest and with one free extremity and, on the other hand, of a bottom connecting rod with one posterior extremity which is connected and mounted pivotably relative to the free extremity of this top connecting rod and with one anterior extremity, this bottom connecting rod carrying the framework of the seat part, a scissor-type stay made, on the one hand, of an upper branch with one end which is in the vicinity of the anterior extremity of this bottom connecting rod and with one free end and, on the other hand, of a lower branch with one free end which is connected and mounted pivotably relative to the free end of this upper branch and with one end which is retained and mounted pivotably relative to the underframe, a cam which has a specific profile and also a cam follower which interacts with this cam and in which one of these cam and cam follower is associated with this underframe and the other of these cam and cam follower is associated with this top connecting rod and has a specific profile.

The subject of the invention is also the application of such a seat to a land motor vehicle, particularly of the so-called "single-volume people carrier" type.

Other features of the invention will emerge upon reading the following description and claims as well as from examining the appended drawing, given solely by way of example in which:

FIG. 1 is a partial and diagrammatic perspective view of one embodiment of a seat in accordance with the invention;

FIGS. 2A and 2B are respectively side and front elevation views of the embodiment of FIG. 1, in the intermediate position;

FIG. 10 is a view similar to that of FIG. 6 of another embodiment of a seat according to the invention.

Figure 3:
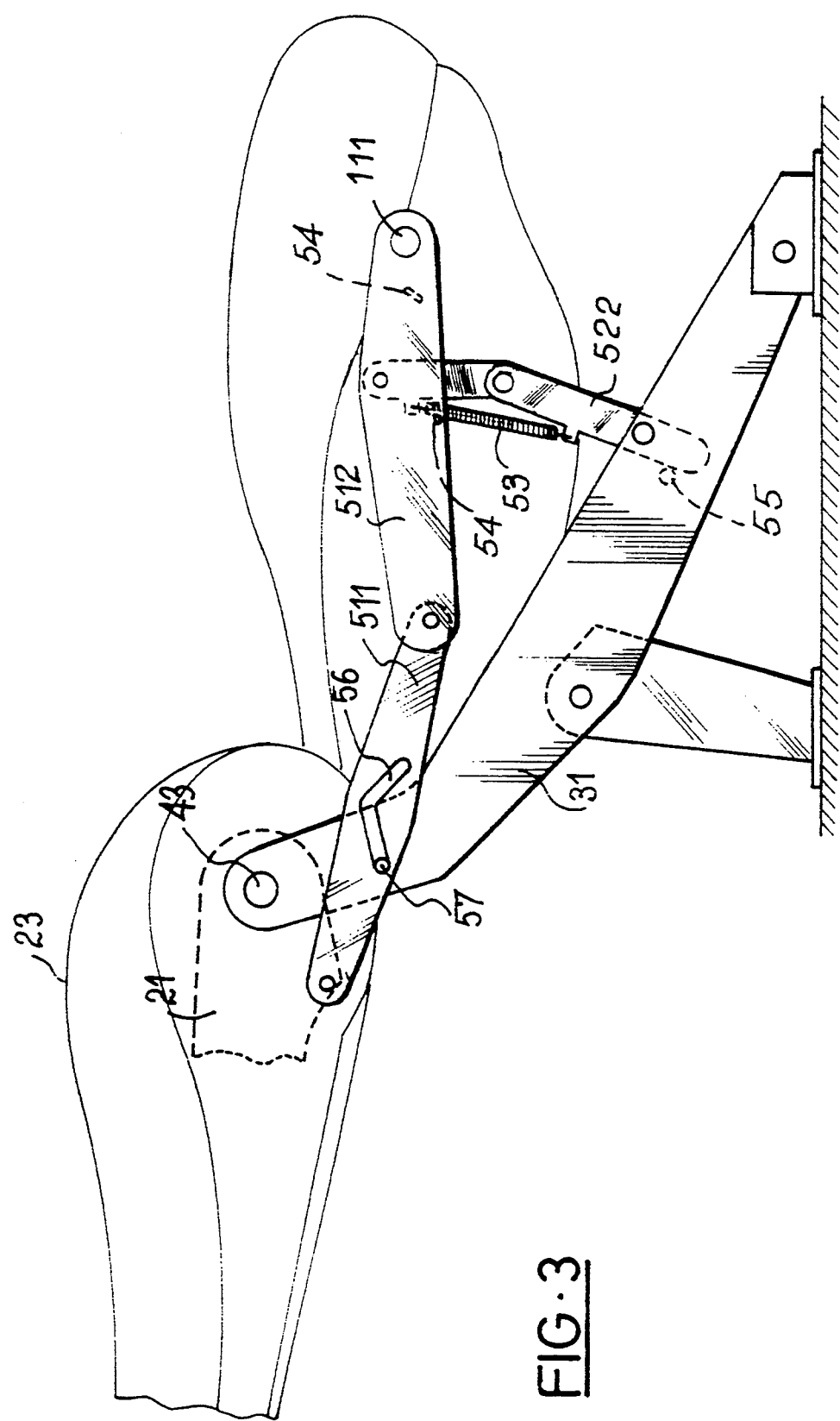
FIG. 3 is a partial diagrammatic detail view similar to that of FIG. 2A of this seat in the bunk position.

As articulated or multi-position seats, particularly intended for vehicles, for example land vehicles, are well known in the art, the following description will describe only that which directly or indirectly relates to the invention. For the rest, the person skilled in the art of the technical sector in question will delve into the common conventional solutions at his disposal so as to face up to the specific problems with which he is confronted.

In the following description, one same reference numeral is used to denote an homologous element, regardless of the embodiment or its variant.

For convenience of the explanation, each of the constituent parts of an improved seat according to the invention will be described in turn before describing, as necessary, the manufacture and assembly thereof, and its operation.

As is seen, in a conventional manner, a seat according to the invention is intended to rest on a ground or a floor P preferably of a land motor vehicle.

Since such a seat is most often symmetrical with respect to a median plane parallel to a plane passing through the longitudinal axis of the vehicle, it will be sufficient to describe and/or illustrate one of the sides thereof, namely the right-hand side or the left-hand side. It is, however, obvious that this symmetry is not absolutely necessary and that some of the constituent parts of the seat according to the invention may be located only on one side. The indications referring to an orientation, such as top, bottom, upper, lower, anterior, posterior, front, back, lateral for example relate to a seat placed normally in a vehicle.

Such a seat essentially comprises a seat part 10, a backrest 20, an underframe 30, an articulation 40 and linkage rod means 50.

As can be seen, the seat part 10 comprises a framework 11 intended to receive a cushion 13. All this is conventional and will not be expanded upon further. It will, however, be observed that this framework 11 is essentially in the form of a frame or the like with front and back supports 111, and if necessary lateral supports 112. It is such a frame which will receive the elastic suspension layer of the cushion with its matting and covering. The backrest 20 itself also comprises a framework 21 intended to receive a cushion 23. All this is conventional.

For the reasons which will appear later, there are grounds for seeing to it that the framework 21 of the backrest is directly mounted on the underframe 30 via the articulation 40, whereas this is not the case for the seat part framework 11 which is not directly connected to the underframe 30. This will emerge clearly later.

The underframe 30 which makes it possible to rest the seat on the ground or on the floor P comprises at least one front leg 31 and at least one back leg 32. In the embodiment shown, it will be observed that the front leg 31 is made with an extension in the direction of the framework of the backrest 21 and it will also be observed that the back leg 32 is mounted movably on the front leg 31 with the aid of an articulation as illustrated.

If needs be, as is conventional, at least one of the legs is connected to the floor with the aid of common mounting and fastening systems of any suitable type which make it possible to tilt the seat and, if required, to separate it from the floor so as to make it removable. This is known.

The articulation 40 comprises a fitting 41 which is integral with or which is attached to the underframe 30, its front leg 31, for example, as well as a fitting 42 which, likewise, is integral with or is attached to the backrest framework 21. This articulation also comprises a pin 43 which makes it possible to modify the relative inclinations of the seat part 10 and of the backrest 20. In FIG. 1, the cushion 13 of the seat part 10 and the cushion 23 of the backrest 20 are diagrammatically illustrated by two planes in discontinuous line which intersect along an axis Δ thereby forming a dihedron of angle α. This is conventional, and will not be expanded upon further.

The linkage rod means 50 comprise, inter alia, a connecting rod assembly 51, a scissor-type stay 52, and if needs be a biasing means 53, limit stops 54 and a stop-piece 55; these linkage rod means also comprise a cam 56 associated with a cam follower 57, as can be seen from examining the figures of the drawing.

The connecting rod assembly 51 comprises a top connecting rod 511 with, on the one hand, one extremity 111 which is retained and mounted pivotably relative to this framework 21 of the backrest with the aid of an articulation of any type whatsoever made, for example, of a pin and at least one bearing sur#ace such as a dowel and holes and with, on the other hand, one free extremity 112. This connecting rod assembly 51 also comprises a bottom connecting rod 512 with, on the one hand, one anterior extremity 5121 and, on the other hand, with one posterior extremity 5122 which is connected and mounted pivotably relative to the free extremity 5112 of the top connecting rod 511. As previously indicated, this articulation is of any conventional type.

As will be observed, the bottom connecting rod 512 carries one of the supports 511 which is intended to receive directly or by means of a cradle or the like, the cushion 13 of the seat part 10, so as to secure the framework and its cushion to the bottom connecting rod, so as to be integral with it in all its displacements. The bottom connecting rod 512 may also serve directly as a lateral support 112.

The scissor-type stay 52 comprises, on the one hand, one upper branch 521 with an end 5211 which is mounted in the vicinity of the anterior extremity 5121 of of the bottom connecting rod 512 and if needs be mounted pivotably relative to the latter and, on the other hand, one free end 5212. This scissor-type stay 52 also comprises a lower branch 522 with, on the one hand, one free end 5222 which i s connected and mounted pivotably relative to the free end 2212 of the upper branch 521 and with, on the other hand, one end 5221 which is retained and mounted pivotably relative to the underframe 30, more especially to its front leg 31, and if needs be which is provided with an extension 5223. That which has already been said as regards the articulations is still valid.

The optional biasing means 53 acts on the branches 521 and 522 of the scissor-type stay 52 so as to tend to close them. This biasing is, for example, exerted by a spring, particularly a coil spring, each of whose ends is anchored to a lug or the like of each of the branches of the scissor-type stay, as illustrated.

If needs be, limit stops 54, two in this embodiment, are placed on the bottom connecting rod 512, on either side of the upper branch 521 of the scissor-type stay when the branch is pivoting so as to limit the path thereof in both directions, as particularly emerges upon examining FIG. 2A.

If needs be, the stop-piece 55 is placed on the underframe 30, more especially on the front leg and is located on one side of the optional extension 5223 of the lower branch 522 of the scissor-type stay 52 so as to limit the path thereof. This stop-piece is, for example, made from a tube or a crossmember which connects the two sides of the underframe 30 or the two front legs 31, so as to increase the rigidity.

The cam 56, which is preferably associated with the top connecting rod 511, is secured to the latter either in that it is machined therefrom, or because it is attached and fixed to it in any suitable manner for example rivetting, welding, bonding, etc. This cam has a specific profile 521, for example in the shape of an obtuse V, as drawn. This cam is formed, for example, like a slit, bent if needs be, so as to have a double profile. The cam follower 57, which interacts with the cam 56 is preferably associated with the underframe 30, preferably at the front leg 31. This cam follower 57 is formed, for example, like a journal or stud engaged in the slit of the cam 56. As will be understood later, the cam 56 and the cam follower 57, together with the rest of the linkage rod means automatically control the relative displacements of the seat part cushion and of the backrest cushion during the change in their relative positions. The specific location of the cam and cam follower may be reversed, the cam being associated with the underframe and the cam follower with the top connecting rod.

As will be observed, for reasons of bulk and also of robustness, the scissor-type stay 52 is mounted on the inner side of the underframe, whilst the connecting rod assembly 51 is mounted at least partially on the outer side of the latter.

As may be noted for the embodiment illustrated, the linkage rod means 50 are doubled and each associated with the right-hand and left-hand sides of a seat. It is obvious, however, that depending on the case, a single set of linkage rod means may be used.

FIG. 10 illustrates another embodiment of a seat according to the invention.

Compared to the embodiment represented in the preceding figures, this new embodiment can be distinguished therefrom particularly by the fact that the cam 56 is rectilinear and associated with the underframe 30, the cam follower 57 is associated with the top connecting rod 511, the upper branch 521 of the scissor-type stay is mounted fixed in the vicinity of the anterior extremity 5121 of the bottom connecting rod 512. This new embodiment can also be distinguished therefrom by the fact that the end 5221 of the lower branch 522 of the scissor-type stay 52 does not comprise an extension and the fact that no elastic biasing means, limit stops, and stop-piece are used.

This embodiment is not designed to have a bunk position.

It will be observed that for this embodiment, the cam follower 57 is coincident with the articulation which connects the free extremity 5112 of the top connecting rod 511 to the posterior extremity 5122 of the bottom connecting rod 512.

In order to allow changes in the relative inclinations of the seat part and of the backrest, the articulation 40 is fitted with an adjustment device and a locking mechanism. These devices and mechanisms, of any conventional common type, allow the user to modify, then immobilise, the seat in each of the various possible multiple positions. One example of such devices and mechanisms is, for example, disclosed by the document FR 92 02 172 filed on Feb. 25, 1992, to which reference may usefully be made and which in incorporated herewith by way of reference.

All the constituent pans of a seat according to the invention, except for its cushions, are entirely or partly made from metal or synthetic materials which are worked and shaped according to conventional techniques. When metal components are used, the latter are for example obtained from bare, tubes, sections or strips, blanks worked by stamping, cutting, folding or the like as is well known. When synthetic materials are used, the latter are, as required, provided with suitable loads or fibres so as to give them the required mechanical properties, and are shaped, for example, by molding or thermo-forming.

All the previously-described elements are brought together, assembled, and mounted as emerges from the figures of the drawing.

In order to pass from one of the multiple and various positions in which the seat has been placed into another desired position, one firstly acts on the locking mechanism mentioned earlier so as to release the inclination adjustment device, also mentioned earlier. The backrest, for example, is then maneuvred by pushing it or pulling it in the direction of the new position to be given to it. Once this new position is reached, the locking mechanism, spontaneously or after having been released, then immobilizes the seat in its new position.

Figure 4:
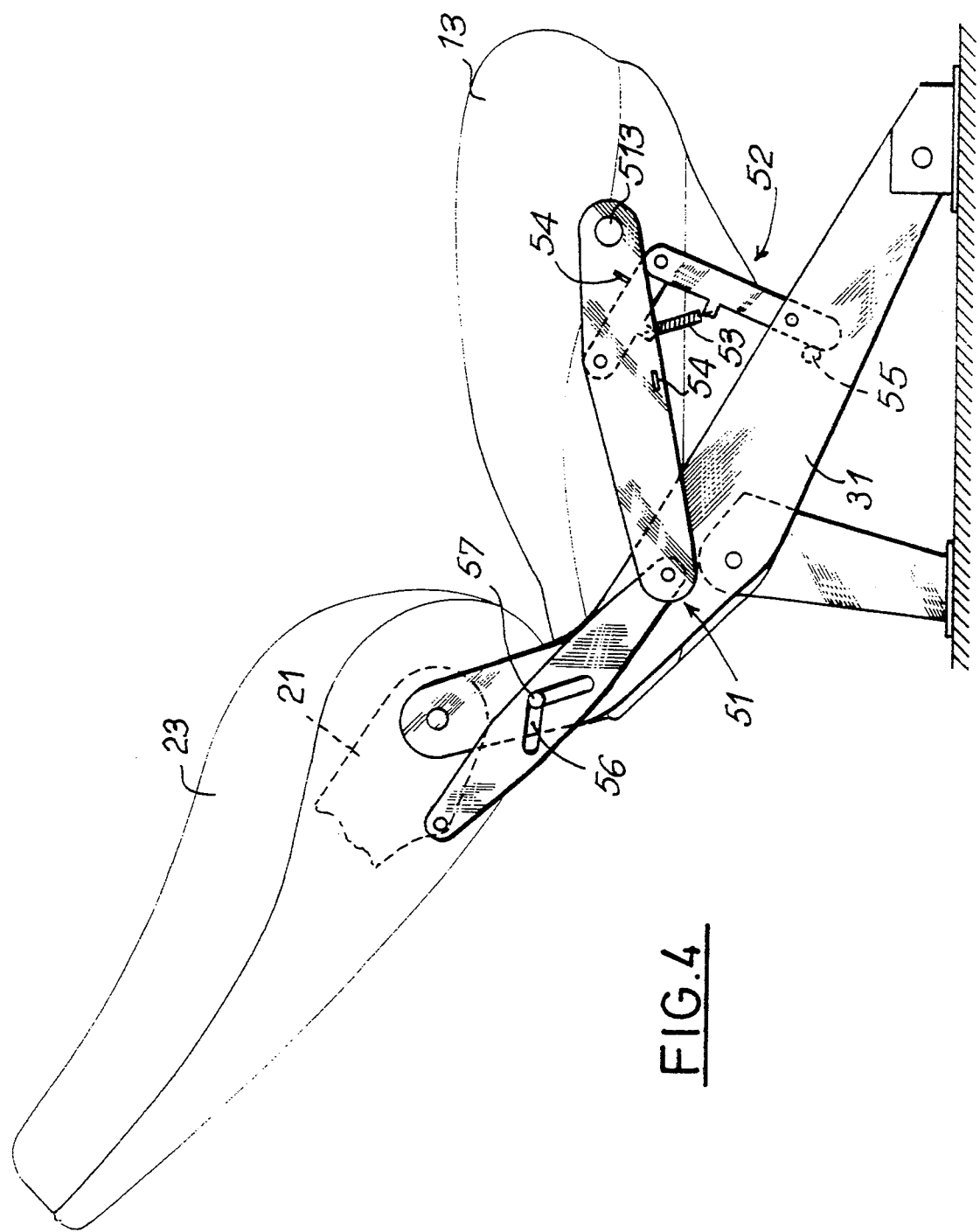
FIG. 4 is a similar view in the relaxation or "lounger" position.
Figure 5:
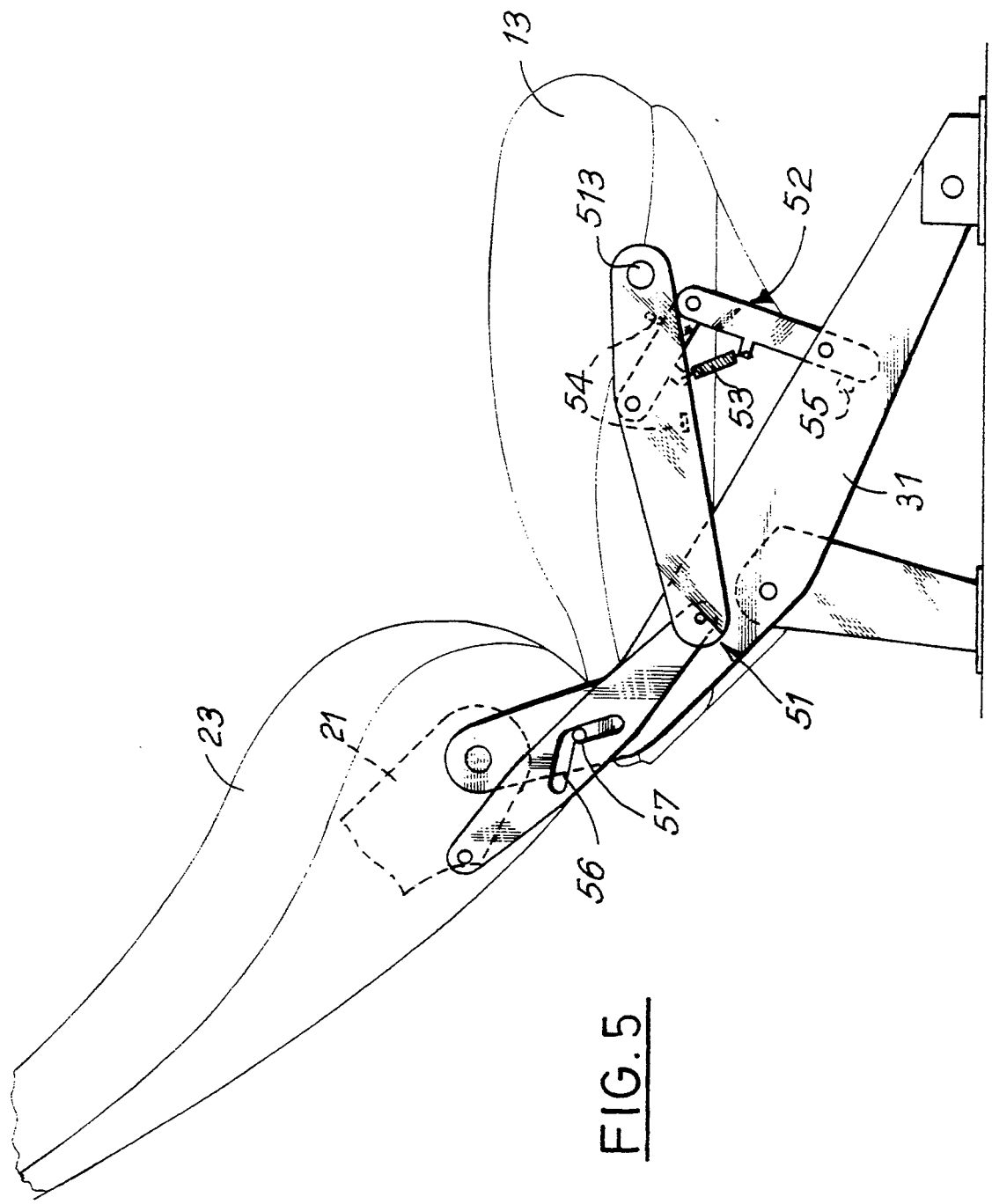
FIG. 5 is a similar view in the intermediate position.
Figure 6:
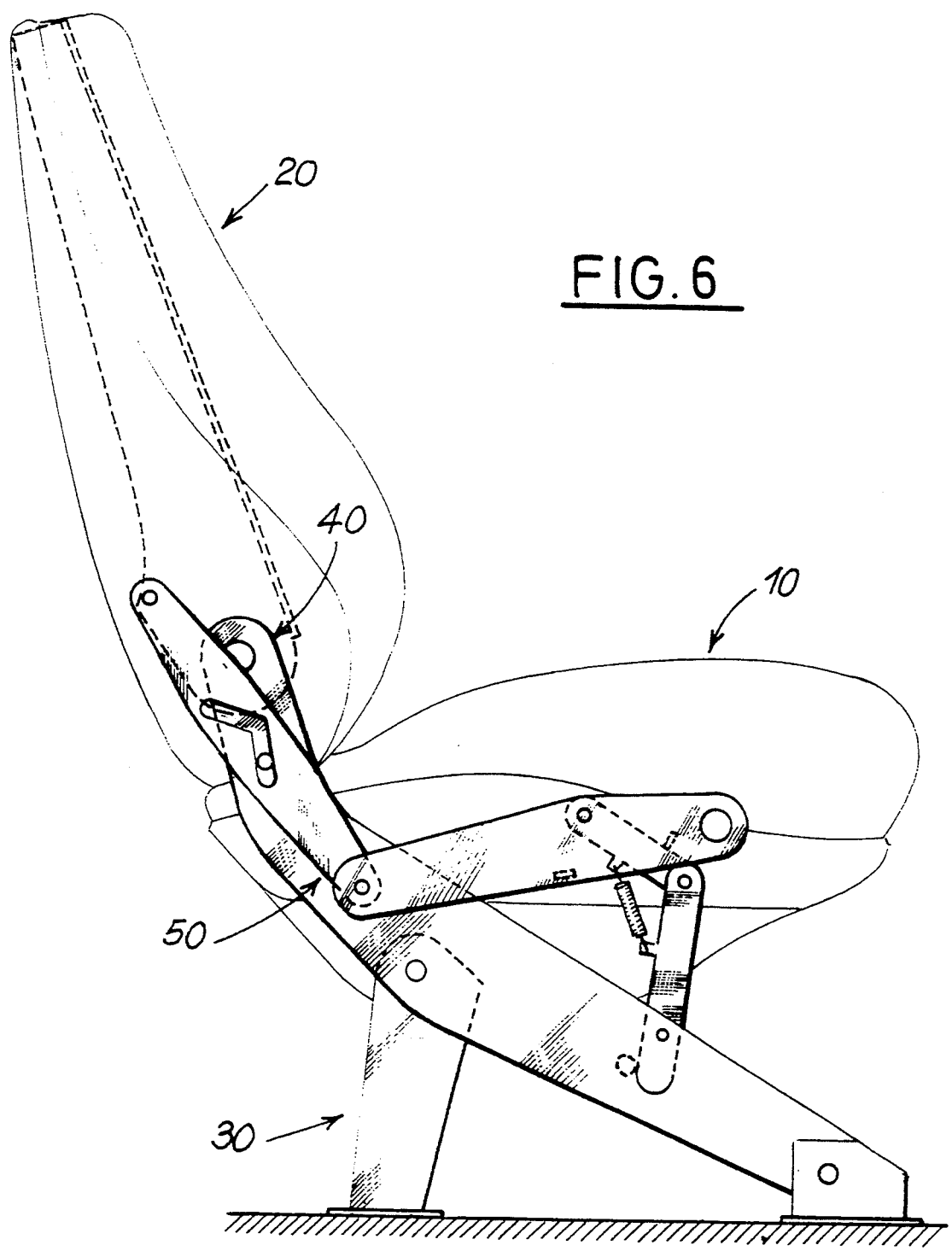
FIG. 6 is a similar view in the normal so-called travel or driving position.
Figure 7:
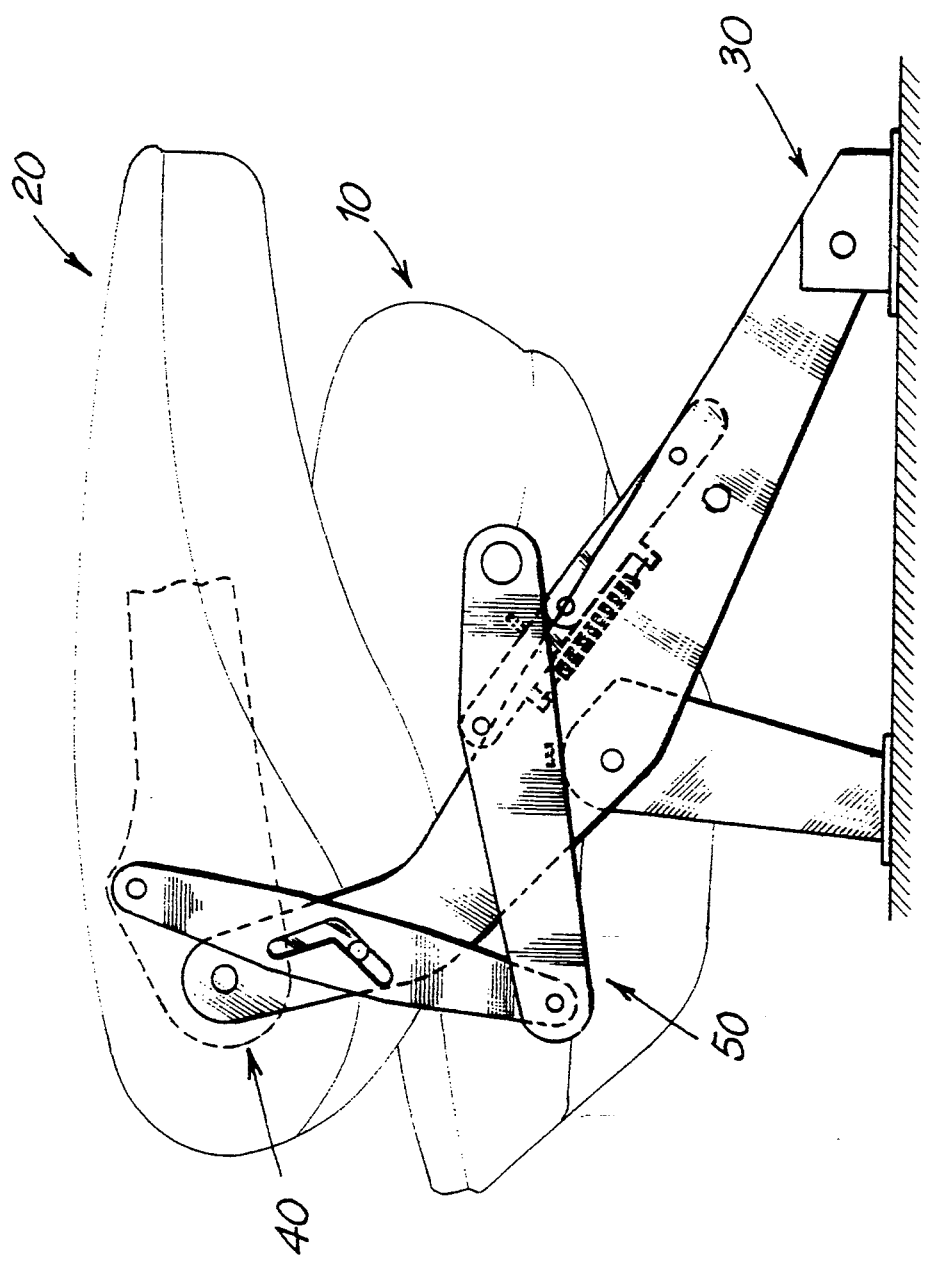
FIG. 7 is a similar view in the panel position.
Figure 8:
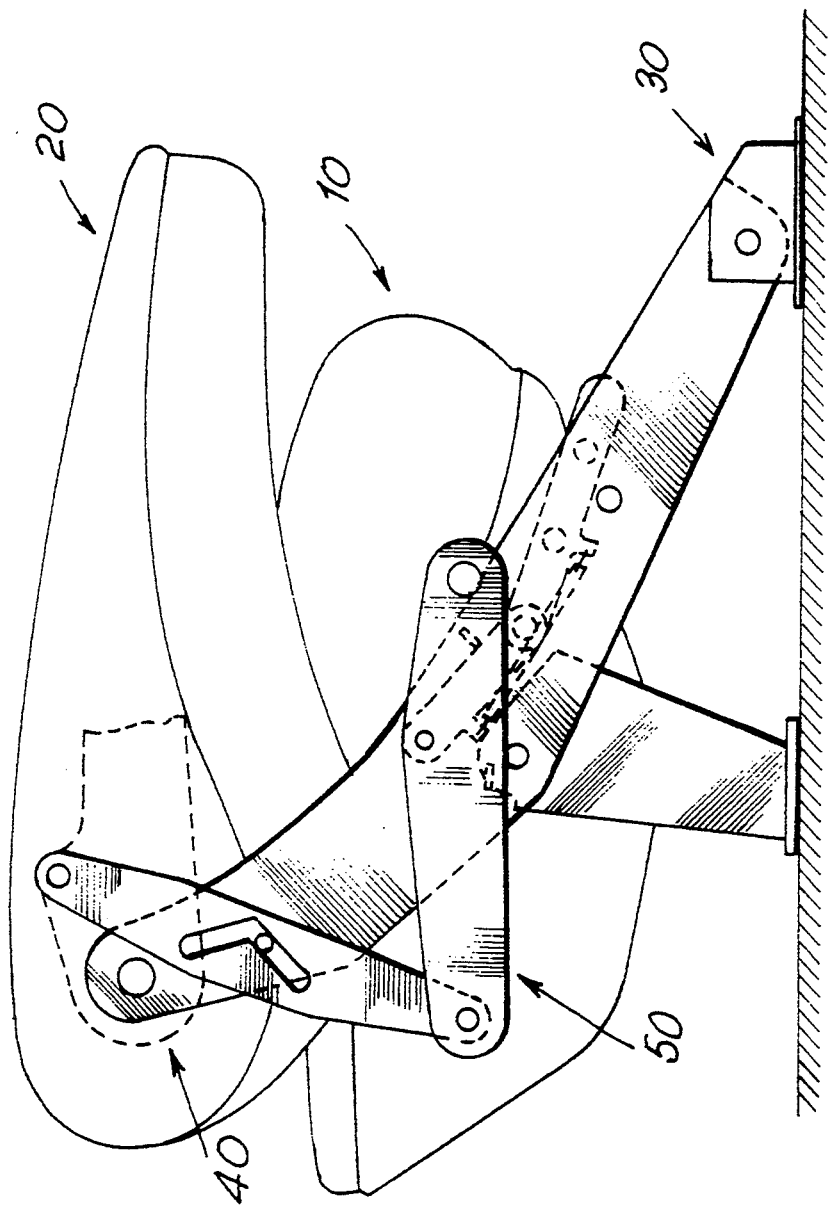
FIG. 8 is a similar view in the "compact" position.
Figure 9:
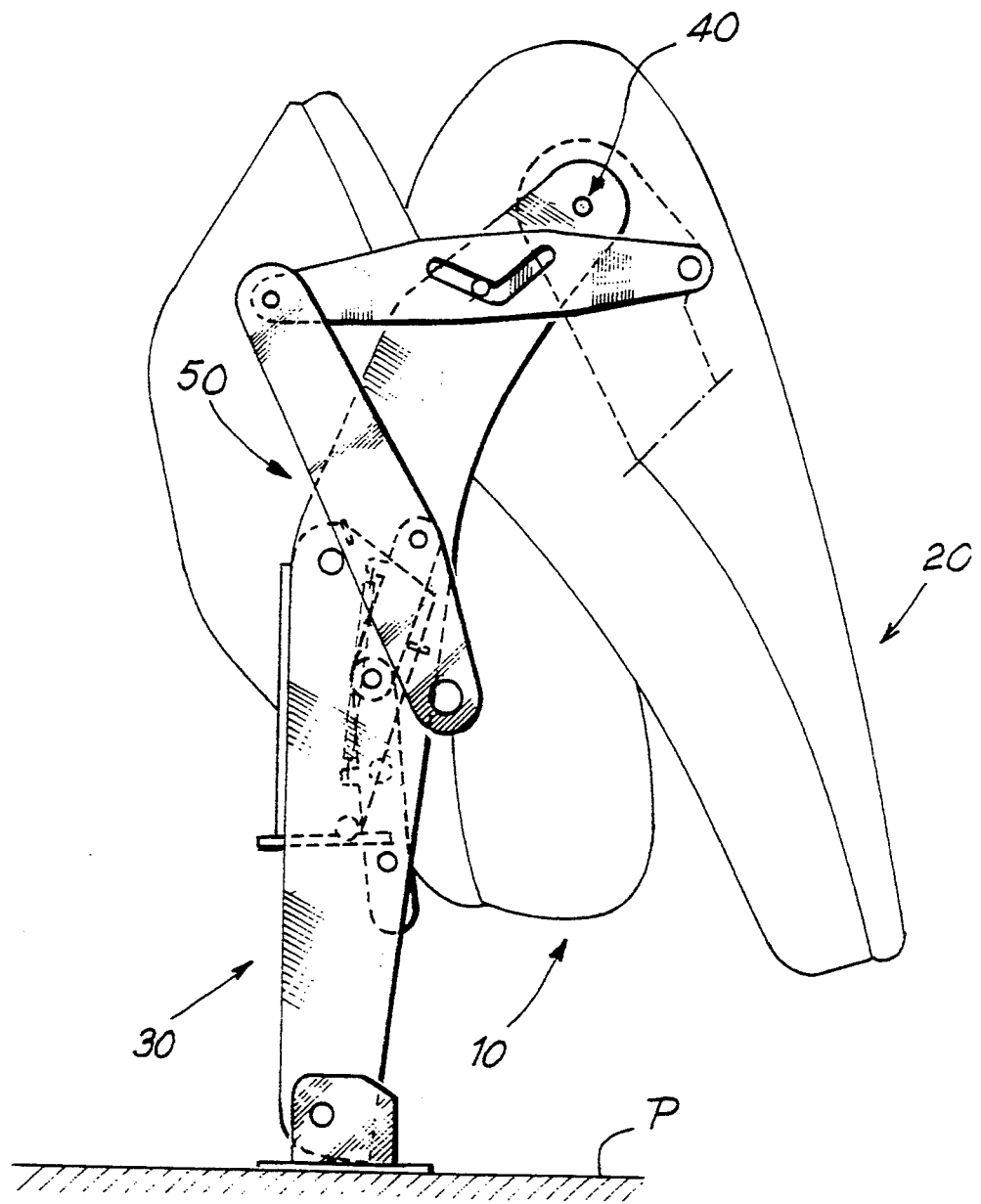
FIG. 9 is a similar view in the folded or folded up position.

By examining the various figures of the drawing, it is understood that the linkage rod means automatically control the displacements of the seat part in relation to those of the backrest. During these relative displacements, it can be seen that the angle $\alpha$ of the dihedron which the planes of the seat part and of the backrest form, either changes, or remains practically constant. This situation in which the angle $\alpha$ remains practically constant is the one which corresponds to the so-called normal or so-called relaxation positions, because it is observed that then the seat part and the backrest remain practically in an immovable relative position but tilt together by pivoting movement about a horizontal axis, that is to say perpendicular to the plane of the sheet of the drawing of FIGS. 2 to 9.

The fact that the angle $\alpha$ remains practically constant for the normal and relaxation positions is important. Indeed, it is for these positions that the occupant of the seat wears his seat belt when the vehicle is travelling. It is also in such a situation that there is a risk of impact with a high longitudinal component, which impact, if it is frontal, risks making the passenger slide over the seat making him escape, unavoidably, from the retention of the seat belt, because his thighs tend to slide over the seat part cushion and his torso and pelvis tend to pass under the chest and abdominal strands of the seat belt.

A seat according to the invention finds one application or use particularly in so-called "single-volume people carrier" type vehicles. When such a seat is in the folded up position, it has a compact configuration of minimal bulk which makes it possible to free some space on the ground for loading bulky objects on the floor or even to allow the seat to be completely removed from the vehicle.

It will be observed that the determined profile of the cam when it is bent makes it possible to obtain a so-called "bunk" position. For the case in which the profile is in the shape of an obtuse V it is the part of the cam which evolves close to the horizontal which then fixes this position. It is, however, obvious that the bunk position is not indispensable.

All the benefits offered by and the advantages given by the seat according to the invention are understood, in particular when such a seat is equipped with a seat belt whose anchoring points are directly fixed to it, a so-called on-board seat belt.

We claim:

1. A multi-position seat, having at least one normal position and one relaxation position, for a vehicle and comprising a seat part (10) with a framework (11) for a cushion (13), a backrest (20) with a framework (21) for a cushion (23), an underframe (30) adapted to rest the seat on a floor, an articulation (40) making it possible to change the relative positions of these seat part and backrest cushions (13, 23) and of linkage rod means (50) for automatically controlling the relative displacements of these seat part and backrest cushions (13, 23) during the change in their relative positions, wherein said articulation (40) connects said backrest framework (21 ) and said underframe (30) wherein these linkage rod means (50) comprise a connecting rod assembly (51 ) made, on the one hand, of a top connecting rod (511) having a first extremity (5111), which is retained and mounted pivotably relative to said framework (21) of the backrest, and having a free second extremity (5112), and, on the other hand, of a bottom connecting rod (512) having a posterior extremity (5122), which is connected and mounted pivotably relative to said free second extremity (5112) of said top connecting rod (511), and having an anterior extremity (5121), said bottom connecting rod (512) carrying said framework (11) of the seat part, a scissor-type stay (52) made, on the one hand, from an upper branch (521) with one end (5211) which is retained close in the vicinity of said anterior extremity (5121) of said bottom connecting rod (512) and with one free end (5212) and, on the other hand, of a lower branch (522) with one free end (5222) which is connected and mounted pivotably relative to said free end (5212) of said upper branch (521) and with one end (5221) which is retained and mounted pivotably relative to said underframe (30), a cam (56) which has a specific profile, and also a cam follower (57) which interacts with said cam (56), wherein one of said cam (56) and cam follower (57) is associated with said underframe (30), and wherein the other of said cam (56) and cam follower (57) is associated with said top connecting rod (511).

2. The seat as claimed in claim 1, wherein said support (513) is fixed to said anterior extremity (5121) of the bottom connecting rod (512).

3. The seat as claimed in claim 2, wherein said scissor-type stay (52) is mounted on the inner side of said underframe (30).

4. The seat as claimed in claim 3, wherein said connecting rod assembly (51) is mounted on the outer side of said underframe (30).

5. The seat as claimed in claim 4, wherein said cam (56) is carried by said top connecting rod (511), and said cam follower (57) is associated with said underframe (30).

6. The seat as claimed in claim 5, wherein said linkage rod means (50) are double and associated with the right-hand and left-hand sides of a seat.

7. The seat as claimed in claim 6, wherein said underframe (30) comprises at least one front leg (31) and at least one back leg (32), in that said front leg (31) carries said articulation (40) and said lower branch (522) and in that said back leg (32) is mounted movably on said seat part framework (11).

8. The seat as claimed in claim 7, further comprising means for removably mounting said underframe (30) on a floor (P).

9. The seat as claimed in claim 5, wherein said profile (561) of the cam (56) is in the shape of an obtuse V.

10. The seat according to claim 1, 2, 3, 4, 5, 6, 7, 8 or 9, wherein said end (5211) of the upper branch (521) of the scissor-type stay (52) is mounted relatively pivotably in the vicinity of said anterior extremity (5121) of said bottom connecting rod (512), in that the end (5221) of said lower branch (522) is provided with an extension (5223), in that it comprises a biasing means (53) acting on said branches (521, 522) of the scissor-type stay (52) and tending to close them, limit stops (54) which are placed on said bottom connecting rod (512) and on each side of said upper branch (521) so as to limit the path thereof, a stop-piece (55) which is placed on said underframe (30) and on one side of said extension (5223) so as to limit the path thereof.

11. The use of a seat as claimed in claim 1 in a land motor vehicle particularly of the so-called "single-volume people carrier" type.

12. The seat as claimed in claim 1, wherein said scissor-type stay is mounted on the inner side of said underframe.

13. The seat as claimed in claim 1 or 2, wherein said connecting rod assembly is mounted on the outer side of said underframe.

14. The seat as claimed in claim 1, 2 or 3, wherein said cam is carried by said top connecting rod, and said cam follower is associated with said underframe.

15. The seat as claimed in claim 1, 2, 3 or 4, wherein said linkage rod means are double and associated with the right-hand and left-hand sides of a seat.

16. The seat as claimed in claim 1, 2, 3, 4 or 5, wherein said underframe comprises at least one front leg and at least one back leg, in that said front leg carries said articulation and said lower branch and in that said back leg is mounted movably on said seat part framework.

17. The seat as claimed in claim 1, 2, 3, 4, 5 or 6, further comprising means for removably mounting said underframe on a floor (P).

18. The seat as claimed in claim 1, 2, 3, 4, 6, 7 or 8, wherein said profile of the cam is in the shape of an obtuse V.

* * * * *